United States Patent [19]
Robe

[11] Patent Number: 6,083,630
[45] Date of Patent: Jul. 4, 2000

[54] ANTI-BLOCKING COATING FOR PRESSURE SENSITIVE ADHESIVES USING CELLULOSE ACETATE BUTYRATE

[75] Inventor: Gary R. Robe, Kingsport, Tenn.

[73] Assignee: Eastman Chemical Company, Kingsport, Tenn.

[21] Appl. No.: 09/411,766

[22] Filed: Oct. 4, 1999

[51] Int. Cl.[7] .................................................. B32B 27/10
[52] U.S. Cl. ..................... 428/481; 428/480; 428/483; 428/500; 428/507; 428/510; 524/81; 524/221; 524/356
[58] Field of Search .................... 428/480, 481, 428/483, 500, 507, 510; 524/81, 221, 356

[56] References Cited

U.S. PATENT DOCUMENTS

| | | |
|---|---|---|
| 3,531,316 | 9/1970 | Sternasty . |
| 3,734,798 | 5/1973 | Dooley ..................................... 156/308 |
| 4,256,505 | 3/1981 | Zweigle et al. ......................... 106/171 |
| 4,259,402 | 3/1981 | Cobbs et al. ............................. 428/310 |
| 4,278,736 | 7/1981 | Kammerling ............................ 428/437 |
| 4,357,168 | 11/1982 | Zweigle et al. ......................... 106/171 |
| 4,925,735 | 5/1990 | Koshizuka et al. . |

FOREIGN PATENT DOCUMENTS

| | | |
|---|---|---|
| 893153 | 2/1972 | Canada . |
| 214939 | 3/1987 | European Pat. Off. . |
| 61-037814 | 2/1986 | Japan . |
| 2-294378 | 12/1990 | Japan . |

*Primary Examiner*—Samuel A. Acquah
*Attorney, Agent, or Firm*—Jonathan D. Wood; Harry J. Gwinnell

[57] ABSTRACT

A composition comprising a hot melt adhesive; and a coating for the adhesive comprising cellulose acetate butyrate, wherein the cellulose acetate butyrate is coated on the hot melt adhesive, and a method to prevent blocking of hot melt adhesives comprising coating cellulose acetate butyrate on at least a portion of the surface of a hot melt adhesive.

14 Claims, No Drawings

ANTI-BLOCKING COATING FOR PRESSURE SENSITIVE ADHESIVES USING CELLULOSE ACETATE BUTYRATE

FIELD OF THE INVENTION

This invention relates to a new anti-blocking agent for hot melt pressure sensitive adhesives (HMPSAs). The anti-blocking agent is a cellulose acetate butyrate (CAB) containing a high butyrate content. The agent is compatible with most commonly used HMPSA's and provides unexpected improvement in performance.

BACKGROUND OF THE INVENTION

The packaging, transportation, and storage of hot melt pressure sensitive adhesives presents a problem to industry because once formed, HMPSA particles tend to agglomerate or "block". HMPSAs are produced in a molten state at high temperatures. From the molten state, the adhesives are cooled to solid form and packaged in a form usable by application equipment. In order to reduce the thermal decomposition of the HMPSA at application temperatures, the melt reservoir of most application equipment is kept small enough to turn over the adhesive rapidly. For this reason, it is necessary to produce blocks, slats, or pellets of HMPSAs which can be manipulated easily by equipment operators and will fit into the openings of the melt reservoirs.

There are two common methods to produce easily handled presentations of HMPSAs. One method is to produce relatively large (0.5–2 kg) blocks of material packaged in strippable containers such as silicone coated paper boxes or plastic films. Another approach is to produce smaller particles such as slats (an extruded ribbon of material cut into individual rectangular shaped pieces weighing 2–10 grams each) or pellets. Pelletized or slatted adhesives must be protected by the use of non-adhesive coatings to prevent the adhesives from blocking.

In order to be effective, an anti-blocking coating must fulfill four basic requirements. First, the coating must be easily and efficiently applied to the adhesive particles. Second, the coating must provide storage stability for the adhesive under normal transportation, storage, and handling conditions. Third, the coating should combine with the adhesive when placed in the applicator. Finally, the coating should not diminish the adhesive properties of the HMPSA.

Materials used for anti-blocking coatings include talc, powdered polyethylene, co-extruded polyethylene films, and polymeric coatings. Powders in general are of limited utility due to the tendency of HMPSAs to flow past the powder coating and block. Additionally, inorganic non-thermoplastic powders such as talc or calcium carbonate are insoluble in the HMPSA and can separate, causing plugging of the applicator. Co-extrusion or "sausage" wrapping of anti-blocking films require costly extra steps in the HMPSA production process. The most desirable types of anti-blocking coatings are those which can be applied to cooling molds or directly to the particles of adhesive.

SUMMARY OF THE INVENTION

We have discovered a new anti-blocking agent for HMP-SA's which is thermally stable and compatible with most HMPSA's. The new anti-blocking agent is cellulose acetate butyrate ("CAB"). The most preferred CAB contains about 55% by weight of the butyrate component and is compatible with most HMPSA's in a percentage range of 0.1 to 2.5 wt. %. The CAB unexpectedly improves the performance of the adhesive.

In accordance with the purpose(s) of this invention, as embodied and broadly described herein, this invention, in one aspect, relates to a composition comprising: a hot melt adhesive; and a coating for the adhesive comprising cellulose acetate butyrate, wherein the cellulose acetate butyrate is coated on the hot melt adhesive.

In another embodiment the invention provides a method to prevent blocking of hot melt adhesives comprising coating cellulose acetate butyrate on at least a portion of the surface of a hot melt adhesive.

Additional aspects and advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DISCUSSION OF THE INVENTION

Before the present compounds, compositions, articles, devices and/or methods are disclosed and described, it is to be understood that this invention is not limited to specific synthetic methods, or specific compositions as such may, of course, vary. It is also to be understood that the terminology used herein is for the purpose of describing particular embodiments only and is not intended to be limiting.

Use of Terms

It must be noted that, as used in the specification and the appended claims, the singular forms "a," "an" and "the" include plural referents unless the context clearly dictates otherwise. Thus, for example, reference to "an adhesive" includes mixtures of adhesives compounds, reference to "a butyrate" includes mixtures of two or more such butyrates, and the like.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. When multiple embodiments are disclosed as successively narrower ranges, other embodiments include all of the mathematically possible ranges formed by combining the various endpoints.

Definitions

References in the specification and concluding claims to parts by weight, of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included.

A residue of a chemical species, as used in the specification and concluding claims, refers to the moiety that is the resulting product of the chemical species in a particular reaction scheme or subsequent formulation or chemical product, regardless of whether the moiety is actually obtained from the chemical species. Thus, an ethylene glycol residue in a polyester refers to one or more —$OCH_2CH_2O$— units in the polyester, regardless of whether ethylene glycol was used to prepare the polyester.

Similarly, a sebacic acid residue in a polyester refers to one or more —CO(CH$_2$)$_8$CO— moieties in the polyester, regardless of whether the residue is obtained by reacting sebacic acid or an ester thereof to obtain the polyester.

"Optional" or "optionally" means that the subsequently described event or circumstance may or may not occur, and that the description includes instances where the event or circumstance occurs and instances where it does not. For example, the phrase "optionally substituted lower alkyl" means that the lower alkyl group may or may not be substituted and that the description includes both unsubstituted lower alkyl and lower alkyl where there is substitution.

By the term "effective amount" of a compound or property as provided herein is meant such amount as is capable of performing the function of the compound or property for which an effective amount is expressed. As will be pointed out below, the exact amount required will vary between processes and/or compounds, depending on recognized variables such as the compounds employed and/or the processing conditions observed. Thus, it is not possible to specify an exact "effective amount." However, an appropriate effective amount may be determined by one of ordinary skill in the art using only routine experimentation.

Discussion

We have discovered that a solution of cellulose acelate butyrate such as CAB-551-0.01 can be applied to particles of HMPSA to form an easily applied anti-blocking coating that provides storage stability, compatibility with common HMPSA systems, and does not detract from the adhesive performance of the coated adhesives. The only exception to the use of CAB is that systems subject to cold flow at room or elevated temperatures may rupture the coating and block.

Thus, in one embodiment the invention provides a composition comprising: a hot melt adhesive; and a coating for the adhesive comprising cellulose acetate butyrate, wherein the cellulose acetate butyrate is coated on the hot melt adhesive. In another embodiment the invention provides a method to prevent blocking of hot melt adhesives comprising coating cellulose acetate butyrate on at least a portion of the surface of a hot melt adhesive.

The cellulose acetate butyrate preferably comprises from about 17 wt. % butyryl to about 58 wt. % butyryl, from about 1 to about 38 wt. % acetyl, and from about 0.5 to about 5 wt. % hydroxyl. Even more preferably the cellulose acetate butyrate comprises from about 50 to about 58 wt. % butyryl, from about 1 to about 30 wt. % acetyl, and from about 1 to about 2 wt. % hydroxyl.

The compositions of this invention preferably comprise from about 95 to about 99.99 wt. % adhesive, and from about 0.01 to about 5 wt. % coating. The adhesive preferably comprises a styrene-isoprene-styrene block copolymer, a styrene-butadiene-styrene block copolymer, a styrene-ethylene-butylene-styreiie block copolymer, an amorphous polyolefin, an ethylene-vinyl acetate, an acrylic, or a polyester. Of these, styrene-isoprene-styrene block copolymers, styrene-butadiene-styrene block copolymers, styrene-ethylene-butylene-styrene block copolymers, amorphous polyolefins, and ethylene-vinyl acetates are most preferred.

The cellulose acetate butyrates of this invention preferably comprise repeat units having the following structure:

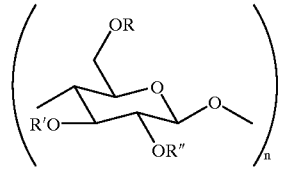

wherein:
(i) R, R', and R" are independently butyryl, hydroxyl, or acetyl, (ii) the cellulose acetate butyrate comprises from about 17 wt. % to about 58 wt. % butyryl, preferably from about 50 wt. % to about 58 wt. % butyryl, (iii) the cellulose acetate butyrate comprises from about 1 to about 38 wt. % acetyl, preferably from about 1 to about 30 wt. % acetyl, (iv) the cellulose acetate butyrate comprises from about 0.5 to about 5 wt. % hydroxyl, preferably from about 1 to about 2 wt. % hydroxyl, and (v) n gives a molecular weight of from about 10,000 to about 70,000, preferably from about 12,000 to about 30,000.

In the methods of this invention the cellulose acetate butyrate is preferably present in the form of a solution or dispersion comprising from about 90 to about 60 wt. % solvent, and from about 10 to about 40 wt. % cellulose acetate butyrate. The solvent is preferably acetone, methylethyl ketone, 80% toluene/20% ethanol, or 2% ethylene glycol monobutyl ether/98% acetone.

The CAB can be easily applied to the adhesive by brushing, spraying or dipping, or can be applied to the mold prior to molding of the adhesive. This solution is ideal for adhesive manufacturers employing cooling molds for their products in that the CAB solution can be spray applied to the molds. The molds can then be filled with molten HMPSA and after cooling the CAB film provides easy release from the mold and an anti-blocking coating for the individual adhesive blocks. In order to provide mold release it is preferred to use molds constructed of polyethylene or polypropylene since CAB has high adhesion to metals. Once de-molded, the blocks of HMPSA can be packaged as seen fit by the manufacturer. The CAB coating has sufficient integrity to prevent blocking under normal transportation and storage conditions.

An alternative application method for coating an HMPSA with CAB is to dip a cooling ribbon of adhesive in a CAB solution. High volume production of HMPSA utilizes an extruded ribbon of adhesive that passes through a cooling water system. At the end of the cooling bath or belt the solidified ribbon of HMPSA can be passed through a CAB solution which would then dry into an anti-blocking, coating.

Thus, in further embodiments, the methods of this invention further comprise the preceding step of applying the cellulose acetate butyrate to the interior surface of an adhesive mold. In another embodiment the method of this invention further comprises the preceding step of applying the cellulose acetate butyrate to the interior surface of an adhesive mold, wherein the adhesive mold is constructed from polyethylene or polypropylene. In still another embodiment of the methods of this invention the coating is performed by dipping a ribbon of the adhesive in a solul ion or dispersion of cellulose acetate butyrate.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric.

In examples 1–6 presented in Table 1, an evaluation was made of four CABs, cellulose acetate, and cellulose nitrate to determine their compatibility with a common HMPSA system based on styrene-isoprene-styrene ("S-I-S") block copolymers such as Kraton D1107 or Kraton D1112 from Shell Chemical Company. The samples were blended with the adhesive at various concentrations to reflect the concentrations expected if the samples were used as anti-blocking coatings.

The results indicate that only the CAB products with the highest butyrate content (55% by weight) were found to be compatible with the adhesive in concentrations of 0.1% to 2.5%. Nitrocellulose was incompatible with the adhesive and rapidly formed a black char.

TABLE 1

| Ex. | Material | Wt % | Wt % | Wt % | Wt % | Wt % | Wt % | Wt % | Wt % | Wt % | Wt % | Wt % |
|---|---|---|---|---|---|---|---|---|---|---|---|---|
|   | Adhesive Base | 99.5 | 99.5 | 99.5 | 99.5 | 99.5 | 99.0 | 97.5 | 99.5 | 99.0 | 97.5 | 95 |
| 1 | Par-Cell R½ sec. | 0.5 | | | | | | | | | | |
| 2 | CA 398-3 | | 0.5 | | | | | | | | | |
| 3 | CAB 171-15 | | | 0.5 | | | | | | | | |
| 4 | CAB 381-0.2 | | | | 0.5 | | | | | | | |
| 5 | CAB 551-0.2 | | | | | 0.5 | 1.0 | 2.5 | | | | |
| 6 | CAB 551-0.01 | | | | | | | | 0.5 | 1.0 | 2.5 | 5.0 |
|   | Molten Solubility Room Temp. | No[b] | No | No | No | Yes | Yes | No | Yes | Yes | Yes | No |
|   | Appearance | Char[b] | T[c] | T | T | C[d] | SH[e] | T | C | C | SH | T |

[a]Adhesive Base Composition:
Kraton D-1107 10%
Kraton D-1112 20%
Eastotac H-100W 54%
Shelflex 371 15%
Irganox 1010 1%
[b]Nitrocellulose charred within 5 minutes when added to molten adhesive at 175° C.
[c] = Turbid
[d] = Clear/Compatible
[e] = Slight Haze Examples 7–11 show the compatibility, storage stability, and effect of adhesive properties of a CAB 551-0.01 anti-blocking coating on various HMPSA systems. Five reference systems were selected to represent a typical range of base polymers, tackifiers, and plasticizers commonly used in HMPSA's. The compositions of the selected adhesives are shown in Table 2. Each of these adhesives was produced and formed into samples using a polypropylene cubicle ice tray suspended in a water bath to simulate adhesive production conditions. The tray was completely coated with a 25% solids solution of CAB551-0.01 in acetone, and then adhesive was poured into the mold chambers at 170–190° C. The resultant formed adhesive pieces were then removed from the molds, with the CAB coating allowing easy demolding as well as forming an anti-block coating. The pieces of the adhesive cubes were then dipped in the CAB solution to coat the tops of the cubes. Several of the cubes were then weighed and washed with acetone to remove the coating. The cubes were reweighed to determine the weight of the add-on coating. In this manner it was determined that coaling add-on was between 0.75 and 1% by weight for each cube.

The samples were placed in an oven at 60 degrees C., for 30 days to determine the stability of the anti-block coating. Four of the samples were still essentially free flowing after the heat-aging period. The one sample which was not stable was the AQ14000 based HMPSA. This sample exhibited cold flow, ruptured the CAB coating and completely fused after two days in the oven.

TABLE 2

HMPSA FORMULATIONS INCLUDED IN THE STUDY

| Example 7 | Kraton D-1107 | 10% | Example 9 | Eastoflex E1200 APE | 65% |
|---|---|---|---|---|---|
| S-I-S Based HMPSA Control | Kraton D-1112 | 20% | APO Based HMPSA Control | Eastotac H-100R | 20% |
| | Eastotac H-100W | 54% | | Indopol H-100 | 5% |
| | Shelflex 371 | 15% | | Irganox 1010 | 1% |
| | Irganox 1010 | 1% | | | |
| Example 8 | Stereon 840A | 14% | Example 10 | Stereon 840A | 27% |
| S-I-S/S-B-S Based HMPSA Control | Kraton D-1107 | 6% | S-B-S Based HMPSA Control | Permalyn 505 | 27% |
| | Eastotac H-100R | 16% | | Zonatac 1100 | 25% |
| | Eastotac H-130R | 32% | | White Oil #1 | 20% |
| | Permalyn 305 | 17% | | Irganox 1010 | 1% |
| | White Oil #1 | 20% | | | |
| | Irganox 1010 | 0.5% | | | |
| Example 11 AQ 14000 Based HMPSA Control | AQ 14000 | 70% | | | |
| | Staybelite | 20% | | | |
| | Benzoflex 9–88 | 10% | | | |
| | Irganox 1010 | 0.5% | | | |

Examples 12–21 show the effect of the addition of the CAB coating to adhesives. Each formula with and without the CAB coating was drawn down on 2 mil Mylar (Dupont, Wilmington, Del.) film at an adhesive thickness of 2 mils. The resultant adhesive tapes were tested for 180° peel adhesion and quick tack to both steel and LDPE using ASTM Method D903, and the rolling ball tack using an Eastman Chemical Company procedure based on PSTC Method 6. The results of these tests are summarized in Table 3. Since CAB 551-0.01 is a hard, high $T_g$ material with low compatibility with the components of the adhesive, it was expected that its addition to the system would be detrimental. In the case of an anti-blocking coating, however, the CAB is added to the adhesive at concentrations at or below its solubility limits and therefore would be expected to have minimal or no effect on the adhesive properties.

The surprising result of these evaluations was that in some cases the CAB significantly improved the adhesive properties. This effect was most pronounced in the S-I-S and APO (Amorphous polyolefin) based HMPSAs, examples 12–15 in Table 3. In the case of the S-I-S based HMPSA, the 180° peel adhesion to both steel and LDPE was increased by a factor of 2. Also, in the case of adhesive to steel, the mode of failure changed from adhesive to cohesive failure. In the case of the APO based HMPSA, all failure modes were cohesive with and without the CAB addition, so that all that was being measured was the internal strength of the adhesive. The APO based HMPSA, however, did exhibit higher tack to steel when the CAB was added. In those adhesives with a measurable rolling ball tack, the CAB did appear to reduce the average number, but when the standard deviation of the tests were taken into consideration the changes were not statistically significant.

IDENTIFICATION OF REFERENCED MATERIALS

| Material Trade Name | Description | Vendor |
| --- | --- | --- |
| CAB 551-0.01 | Cellulose Acetate Butyrate (55 wt. % butyrate) | Eastman Chemical Company Kingsport, TN |
| CAB-551-0.2 | Cellulose Acetate Butyrate (55 wt. % butyrate) | Eastman Chemical Company |
| CAB-381-0.2 | Cellulose Acetate Butyrate (38 wt. % butyrate) | Eastman Chemical Company |
| CAB-171-15 | Cellulose Acetate Butyrate (17 wt. % butyrate) | Eastman Chemical Company |
| CA-398-3 | Cellulose Acetate | Eastman Chemical Company |
| Par-Cell R½sec | Nitrocellulose | Hercules Chemical Company Wilmington, DE |
| Stereon 840A | S-B-S Block Copolymer (Styrene-butadiene-styrene) | Firestone Synthetic Rubber & Latex Co., Akron, OH |
| Kraton D-1107 | S-I-S Block Copolymer (Styrene-isoprene-styrene) | Shell Chemical Company Houston, TX |

TABLE 3

RESULTS OF ADHESIVE PROPERTY COMPARISONS WITH/WITHOUT CAB-551-0.01 COATING

| | Example Number | | | | | | | | | |
| --- | --- | --- | --- | --- | --- | --- | --- | --- | --- | --- |
| | 12 | 13 | 14 | 15 | 16 | 17 | 18 | 19 | 20 | 21 |
| | Adhesive Identification | | | | | | | | | |
| | S-I-S Control | S-I-S + CAB | APO Control | APO + CAB | S-I-S/ S-B-S Control | S-I-S/ S-B-S + CAB | S-B-S Control | S-B-S + CAB | AQ 14000 Control | AQ 14000 + CAB |
| 180° Peel to steel, g/mm | 107.1 | 203.0 | 121.8 | 111.1 | 203.0 | 151.8 | 40.1 | 40.9 | 6.1 | 31.4 |
| Standard deviation | 5.69 | 13.16 | 4.36 | 6.69 | 13.01 | 10.93 | 1.55 | 1.30 | 2.16 | 20.91 |
| 180° Peel to PE, g/mm | 87.3 | 101.6 | 121.1 | 111.3 | 22.7 | 9.4 | 36.4 | 34.2 | 14.2 | 17.5 |
| Standard deviation | 11.07 | 6.83 | 3.63 | 3.7 | 9.56 | 4.33 | 6.24 | 4.93 | 6.20 | 6.15 |
| Quick Tack to Steel, g/mm | 119.5 | 150.1 | 28.6 | 75.3 | 19.4 | 3.7 | 53.0 | 46.4 | 4.7 | 4.1 |
| Standard deviation | 12.02 | 5.15 | 24.5 | 28.6 | 8.84 | 2.36 | 10.44 | 5.69 | 1.24 | 2.47 |
| Quick Tack to PE, g/mm | 82.5 | 92.6 | 33.4 | 27.5 | 4.4 | 0.7 | 32.0 | 34.9 | 6.3 | 3.9 |
| Standard deviation | 5.90 | 15.54 | 7.46 | 5.25 | 2.02 | 0.62 | 5.15 | 3.46 | 4.39 | 3.09 |
| Rolling Ball Tack, cm | 19.28 | 30.35 | 148.8 | 123.9 | No Tack | No Tack | 22.20 | 30.23 | No Tack | No Tack |
| Standard deviation | 5.79 | 5.87 | 46.74 | 23.62 | N/A | N/A | 4.39 | 6.30 | N/A | N/A |

These examples show that CAB, when applied to HMPSA's at rates that reduce blocking, is sufficiently soluble in most HMPSA's to be universally useful as an anti-blocking agent. The examples also showed storage stability at 60 degrees for 30 days, maintaining anti-blocking properties, and unexpectedly improving adhesive performance on steel and LDPE. All materials used in the examples are shown below:

-continued

IDENTIFICATION OF REFERENCED MATERIALS

| Material Trade Name | Description | Vendor |
| --- | --- | --- |
| Kraton D-1111 | S-I-S Block Copolymer | Shell Chemical Company |
| Eastotac H-100R | Aliphatic hydrocarbon | Eastman Chemical Company |

-continued

IDENTIFICATION OF REFERENCED MATERIALS

| Material Trade Name | Description | Vendor |
|---|---|---|
| Eastotac H-130R | tackifying resin Aliphatic hydrocarbon tackifying resin | Eastman Chemical Company |
| Eastoflex E1200 | Amorphous propylene-ethylene copolymer | Eastman Chemical Company |
| Eastotac H-100W | Aliphatic hydrocarbon tackifying resin | Eastman Chemical Company |
| Indopol H-100 | Polybutene plasticizer | Amoco Chemical Company |
| Shelflex 371 | Naphtenic plasticizing oil | Shell Chemical Company |
| White Oil #1 | Mineral Oil | Texaco Chemical Co. Austin, TX |
| Irganox 1010 | Antioxidant | Ciba Additives Div. Hawthorne, NY |
| Zonatac 1100 | Polyterpene tackifying resin | Arizona Chemical Company Div. Of Intl. Paper Panama City, FL |
| Benzoflex 9-88 | Diethylene glycol dibenzoate plasticizer | Velsicol Chemical Company Rosemont, IL |
| AQ 14000 | Water dispersible polyester polymer | Eastman Chemical Company |
| Staybelite | Acid rosin tackifier | Hercules Chemical Company |
| Permalyn 303 | Rosin Ester tackifying resin | Hercules Chemical Company |
| Permalyn 505 | Rosin Ester tackifying resin | Hercules Chemical Company |

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A composition comprising:
   a hot melt adhesive; and
   a coating for the adhesive comprising cellulose acetate butyrate, wherein the cellulose acetate butyrate is coated on the hot melt adhesive.

2. The composition of claim 1 wherein the cellulose acetate butyrate comprises from about 17 wt. % butyryl to about 58 wt. % butyryl, from about 1 to about 38 wt. % acetyl, and from about 0.5 to about 5 wt. % hydroxyl.

3. The composition of claim 1 wherein the cellulose acetate butyrate comprises from about 50 to about 58 wt. % butyryl, from about 1 to about 30 wt. % acetyl, and from about 1 to about 2 wt. % hydroxyl.

4. The composition of claim 1 comprising from about 95 to about 99.99 wt. % adhesive, and from about 0.01 to about 5 wt. % coating.

5. The composition of claim 1 wherein the adhesive comprises a styrene-isoprene-styrene block copolymer, a styrene-butadiene-styrene block copolymer, a styrene-ethylene-butylene-styrene block copolymer, an amorphous polyolefin, an ethylene-vinyl acetate, an acrylic, or a polyester.

6. The composition of claim 1 wherein the adhesive comprises a styrene-isoprene-styrene block copolymer, a styrene-butadiene-styrene block copolymer, a styrene-ethylene-butylene-styrene block copolymer, an amorphous polyolefin, or an ethylene-vinyl acetate.

7. The composition of claim 1 wherein the cellulose acetate butyrate comprises repeat units having the following structure:

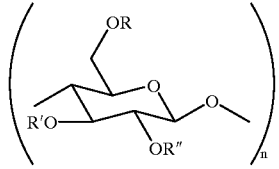

wherein (i) R, R', and R" are independently butyryl, hydroxyl, or acetyl, (ii) the cellulose acetate butyrate comprises from about 17 wt. % to about 58 wt. % butyryl, from about 1 to about 38 wt. % acetyl, and from about 0.5 to about 5 wt. % hydroxyl, and (iii) n gives a molecular weight of from about 10,000 to about 70,000.

8. The composition of claim 1 wherein the cellulose acetate butyrate comprises repeat units having the following structure:

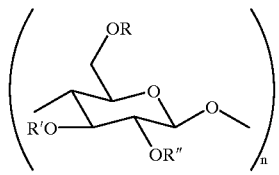

wherein R, R', and R" are butyryl, hydroxyl, or acetyl, (ii) the cellulose acetate butyrate comprises from about 50 wt. % to about 58 wt. % butyryl, from about 1 to about 30 wt. % acetyl, and from about 1 to about 2 wt %. hydroxyl, and (iii) n gives a molecular weight of from about 12,000 to about 30,000.

9. A method to prevent blocking of hot melt adhesives comprising coating cellulose acetate butyrate on at least a portion of the surface of a hot melt adhesive.

10. The method of claim 9 wherein the cellulose acetate butyrate is in the form of a solution or dispersion comprising from about 90 to about 60 wt. % solvent, and from about 10 to about 40 wt. % cellulose acetate butyrate.

11. The method of claim 9 wherein the cellulose acetate butyrate is in the form of a solution or dispersion comprising from about 90 to about 60 wt. % solvent, and from about 90 to about 60 wt. % solvent or dispersant, wherein the solvent is acetone, methyl-ethyl ketone, 80% toluene/20% ethanol, or 2% ethylene glycol monobutyl ether/98% acetone.

12. The method of claim 9 further comprising the preceding step of applying the cellulose acetate butyrate to the interior surface of an adhesive mold.

13. The method of claim 9 further comprising the preceding step of applying the cellulose acetate butyrate to the interior surface of an adhesive mold, wherein the adhesive mold is constructed from polyethylene or polypropylene.

14. The method of claim 9 wherein the coating is performed by dipping a ribbon of the adhesive in a solution or dispersion of cellulose acetate butyrate.

* * * * *